United States Patent
Topper et al.

(10) Patent No.: US 7,084,924 B2
(45) Date of Patent: Aug. 1, 2006

(54) METHOD, APPARATUS, AND SYSTEM FOR DISPLAYING WIDESCREEN VIDEO IMAGES ON STANDARD VIDEO DISPLAYS

(75) Inventors: Robert J. Topper, Hatboro, PA (US); Lee R. Dischert, Burlington, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 597 days.

(21) Appl. No.: 10/396,006

(22) Filed: Mar. 24, 2003

(65) Prior Publication Data

US 2004/0189864 A1    Sep. 30, 2004

(51) Int. Cl.
*H04N 7/01* (2006.01)
*H04N 9/74* (2006.01)

(52) U.S. Cl. ............... 348/445; 348/581; 348/913

(58) Field of Classification Search ......... 348/441, 348/445, 458, 581, 913, 578, 580, 582, 583; 382/298; 345/660, 670, 671, 472, 472.1, 345/472.2; H04N 7/01, 11/20, 9/74
See application file for complete search history.

(56) References Cited

U.S. PATENT DOCUMENTS

| | | | |
|---|---|---|---|
| 4,951,149 A | 8/1990 | Faroudja | |
| 5,136,398 A | 8/1992 | Rodriguez-Cavazos et al. | |
| 5,587,742 A | 12/1996 | Hau et al. | |
| 5,638,130 A * | 6/1997 | Linzer | 348/445 |
| 5,742,334 A * | 4/1998 | Yagura et al. | 348/581 |
| 6,118,487 A | 9/2000 | Hirtz et al. | |
| 6,259,479 B1 | 7/2001 | Gadre et al. | |
| 6,262,772 B1 | 7/2001 | Shen et al. | |
| 6,310,655 B1 | 10/2001 | Godwin | |
| 6,310,918 B1 | 10/2001 | Saha et al. | |
| 6,340,992 B1 | 1/2002 | Markandey | |
| 6,400,852 B1 * | 6/2002 | Miller et al. | 348/581 |

\* cited by examiner

*Primary Examiner*—Sherrie Hsia
(74) *Attorney, Agent, or Firm*—RatnerPrestia (57) ABSTRACT

A method, apparatus, and system for displaying widescreen video images on a stand video display is disclosed. Letterboxing, which occurs when a widescreen image is displayed in its entirety on a standard video display, is removed by enlarging the widescreen image and panning the enlarged widescreen image responsive to a multi-channel audio signal corresponding to the widescreen image.

20 Claims, 4 Drawing Sheets

METHOD, APPARATUS, AND SYSTEM FOR DISPLAYING WIDESCREEN VIDEO IMAGES ON STANDARD VIDEO DISPLAYS

FIELD OF THE INVENTION

The present invention relates to the field of consumer electronics and, more particularly, to methods, apparatus, and systems for displaying widescreen video images on standard video displays.

BACKGROUND OF THE INVENTION

Standard television video displays are sized to display 4×3 aspect ratio video images (referred to hereinafter as "standard" images). Video images, however, often have an aspect ratio (i.e., width to height ratio) that is wider than the standard 4×3 aspect ratio, commonly referred to as "widescreen" images. For example, the motion picture industry commonly distributes motion pictures having an aspect ratio of 14×9 or greater.

An area of concern with widescreen images is their compatibility with the millions of televisions in use that have standard 4×3 aspect ratio video displays (referred to hereinafter as "standard" video displays). A standard image is approximately 33.3% taller than a 16×9 widescreen image of the same horizontal width. Accordingly, when displaying a 16×9 widescreen image in its entirety on a standard video display, approximately 25% of the video display's display area is unused. Typically, black bars are displayed in the upper ⅛ and the lower ⅛ of the display area, which is a display format known as "letterboxing." Widescreen images having other aspect ratios, e.g., 14×9, also use only a portion of the video display's display area with black bars above and below the widescreen image. Since letterboxed widescreen images do not use the entire display area of a standard video display, many viewers find that the displayed widescreen images are too small for comfortable viewing. In addition, many viewers are distracted by the black bars.

A common method of eliminating the black bars associated with letterboxed video involves displaying only a 4×3 portion of the widescreen video images. Thus, a standard video display displays a 4×3 "window" of the larger widescreen image. To create the 4×3 window from a widescreen image, a device such as a flying spot telecine is employed. The flying spot telecine has a viewing window with an aspect ratio of 4×3. Typically, an operator moves the window to track the center-of-action on the widescreen image, commonly referred to as "pan and scan," to crop more or less of the left and right hand portions as necessary. The "cropped" version of the letterboxed video is then distributed for display on standard video display.

Current video standards such as MPEG-2 support automatic pan and scan. In automatic pan and scan, the center-of-action tracked by the operator is encoded with the widescreen image on the media containing the widescreen image, e.g., on a digital versatile disc (DVD). Video players that support such standards are capable of decoding the center-of-action and displaying the 4×3 window of the widescreen image selected by the operator for display on a standard video display.

Many existing video players, however, do not support automatic pan and scan. In addition, a large amount of media containing widescreen images is not encoded with pan and scan information. Accordingly, methods, apparatus, and systems are needed to display widescreen images on standard video displays without letterboxing that are not subject to the limitations of the prior art. The present invention fulfills this need among others.

SUMMARY

The present invention provides a method, apparatus, and system for displaying an active widescreen image on a standard video display without the use of letterboxing. The present invention satisfies the aforementioned need by enlarging an active widescreen image having a corresponding multi-channel audio signal such that the horizontal dimension of the enlarged widescreen image approaches the horizontal dimension of the standard display. A portion of the enlarged widescreen image is then displayed responsive to the multi-channel audio signal. The multi-channel audio signal provides an indication of the location of audio sources within the enlarged widescreen image, which indicates the area of the widescreen image of most interest to a viewer. The audio source location information is used to select the proper portion of the enlarged widescreen image for display, thus decreasing the impact of having non-displayed portions of the widescreen image.

A method, apparatus, and system in accordance with the present invention displays an active video image from an image signal on a video display, each of the active video image and the video display having an aspect ratio, the image signal having a corresponding multi-channel audio signal that may be processed to produce at least a left audio channel and a right audio channel, the aspect ratio of the active video image being wider than the aspect ratio of the video display.

The method includes sizing the active video image such that the vertical dimension of the sized image is substantially equal to the vertical dimension of the video display, the sizing resulting in the horizontal dimension of the sized image being larger than the horizontal dimension of the video display; and displaying a portion of the sized image responsive to the audio track, the displayed portion having a horizontal dimension substantially equal to the horizontal dimension of the video display.

The apparatus includes a controller that produces an offset signal responsive to the multi-channel audio signal and an image processor that enlarges the image and displays a portion of the enlarged image corresponding to the offset signal.

The system includes means for sizing the active video image such that the vertical dimension of the sized image is substantially equal to the vertical dimension of the video display, the sizing resulting in the horizontal dimension of the sized image being larger than the horizontal dimension of the video display; and means for displaying a portion of the sized image responsive to the audio track, the displayed portion having a horizontal dimension substantially equal to the horizontal dimension of the video display.

BRIEF DESCRIPTION OF THE DRAWINGS

The invention is best understood from the following detailed description when read in connection with the accompanying drawings, with like elements having the same reference numerals. This emphasizes that according to common practice, the various features of the drawings are not drawn to scale. On the contrary, the dimensions of the various features are arbitrarily expanded or reduced for clarity. Included in the drawings are the following features.

DETAILED DESCRIPTION OF THE INVENTION

Figure 1:
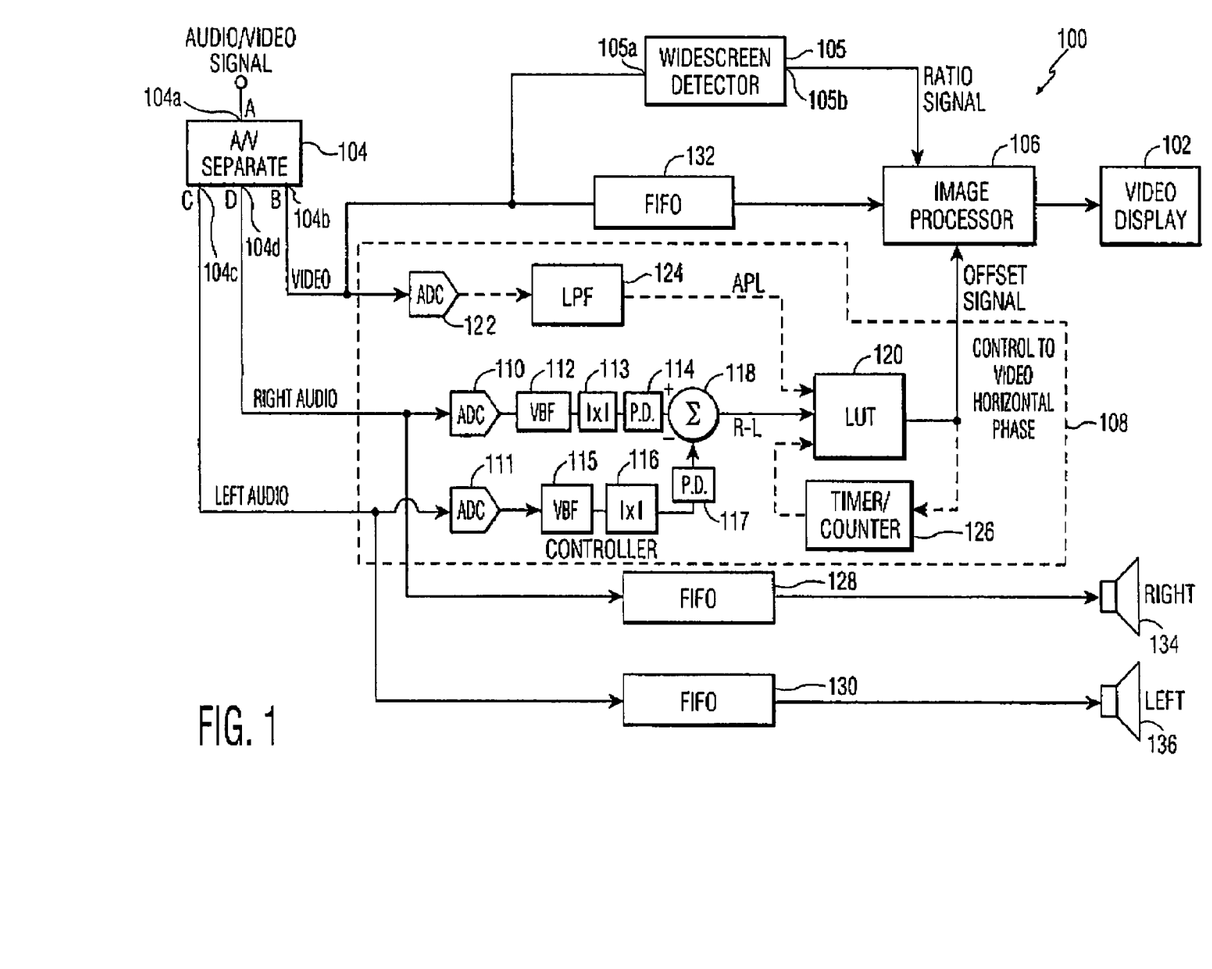
FIG. 1 is a block diagram of an audio/video apparatus in accordance with the present invention.

FIG. 1 depicts an audio/video apparatus 100 for displaying an active video image on a video display 102 having a smaller aspect ratio than the active video image in accordance with one embodiment of the present invention. The active video image represents the area of the video image containing visible detail. For example, a video signal carrying a 16×9 widescreen video image for display in its entirety on a standard 4×3 video display includes black lines for display above and below the widescreen video image. Thus, the total video image carried by the video signal includes the widescreen video image and video images of black bars above and below the widescreen video image. The widescreen video image, without the black bars, is commonly referred to as the active video image. Although the display apparatus 100 of the present invention may be used to size a video image of essentially any aspect ratio for display on a video display having essentially any aspect ratio, it is especially useful for enlarging a widescreen video image (i.e., an image having an aspect ratio greater than 4×3) and selecting a portion of the enlarged widescreen image for display on standard video displays (i.e., a video image having an aspect ratio of 4×3) without the use of "letterboxing." Accordingly, the present invention is described in conjunction with such use.

The display device 102 is a conventional display device for displaying images. The display device 102 has a horizontal dimension and a vertical dimension. In an exemplary embodiment, the display device 102 has a standard aspect ratio, i.e., 4×3. Accordingly, for every four (4) units of horizontal width, the display device 102 has three (3) units of vertical height.

An audio/video (A/V) filter 104 separates an audio/video signal into its audio and video components. The audio/video signal includes a composite video signal and a corresponding multi-channel audio signal that may be processed to produce at least a left audio channel and a right audio channel. In the illustrated embodiment, the A/V filter 104 receives the A/V signal at an input port 104a and produces a composite video signal at a video output port 104b, a left audio signal for the left audio channel at a left audio output port 104c, and a right audio signal for the right audio channel at a right audio output port 104d. The composite video signal at the video output port 104b carries video images of active widescreen images with black bar images for display above and below the active widescreen images when displayed on a standard 4×3 video display 102. The active widescreen images have an aspect ratio representing a horizontal dimension and a vertical dimension.

A widescreen detector 105 detects the aspect ratio of the active widescreen images. The widescreen detector 105 receives the composite video signal from the A/V separator 104 at an input port 105a and generates a ratio signal at an output port 105b for use by the image processor 106. The ratio signal provides an indication of the aspect ratio of the active widescreen image. In an exemplary embodiment, first, the widescreen detector 106 detects the number of black lines and the total number of lines within a field or frame (compensating for the vertical blanking interval). In this exemplary embodiment of the invention, a black line is any line having pixel values that are within a predetermined threshold level (e.g., 10 IRE) of black level across the entire active video interval of the line. The widescreen detector 105 then processes the black lines and the total lines to produce the ratio signal. For example, a standard 4×3 video frame has 525 displayable lines in a frame. If one-third of the displayable lines are black lines, the active widescreen image is three-quarters the height of a standard display, indicating that the active widescreen image is a 16×9 widescreen image. Accordingly, the widescreen detector 105 produces a ratio signal representing the 16×9 aspect ratio. Alternatively, the viewer may be provided with a control to scale the image in increments or according to preset aspect ratios until a desired image height is obtained.

An image processor 106 processes the composite video signal for display on the video display 102. The image processor 106 enlarges the widescreen images based on the ratio signal generated by the widescreen detector 105 and selects portions of the enlarged widescreen images for display based on an offset signal from a controller 108 (described below). The selected portion is then displayed on the video display 102.

Figure 2A:
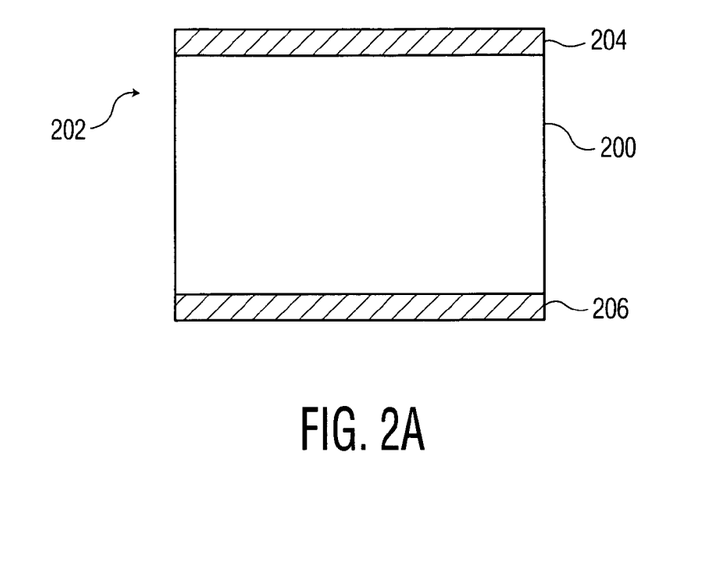
FIG. 2A is an illustration of a widescreen image displayed in its entirety on a standard video display.
Figure 2B:
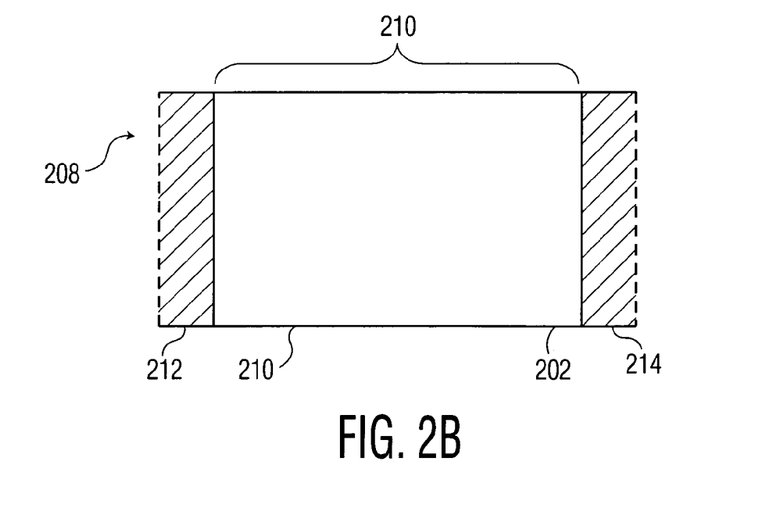
FIG. 2B is an illustration of an enlarged widescreen image partially displayed on a standard video display.

FIG. 2A depicts an active widescreen image 200 displayed on a standard video display 202 with a first black band 204 above the widescreen image 200 and a second black band 206 below the widescreen image 200. FIG. 2B depicts an enlarged widescreen image 208 displayed on the standard 4×3 video display 202, which eliminates the first and second black bands 204, 206 (FIG. 2A). Only a portion (i.e., window) 210 of the enlarged widescreen display 208, however, may be displayed on the standard video display 202 if the original aspect ratio of the widescreen image is maintained. The original aspect ratio is maintained so objects within the widescreen images do not appear compressed or stretched. In an exemplary embodiment, the aspect ratio of the portion 210 corresponds to the aspect ratio of the standard display 202. Since only a portion 210 of the enlarged widescreen image 208 is displayable, one or more portions of the enlarged widescreen image 208 are not displayed (represented by left side portion 212 and right side portion 214. The present invention displays different portions of the enlarged widescreen image 208 based on the audio portion of the audio video signal, as described in detail below, to decrease the visual impact of having non-displayed portions, e.g., portions 212, 214.

Figure 3A:
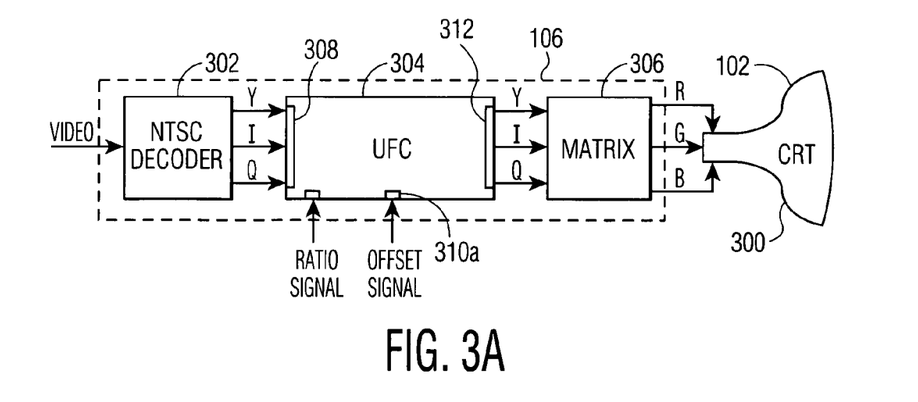
FIG. 3A is a block diagram of an exemplary image processor 106 for use in the audio/video apparatus of FIG. 1.

FIG. 3A depicts an exemplary embodiment of the image processor 106 for displaying a widescreen image on a video display 102 such as a cathode ray tube (CRT) 300. The image processor 106 illustrated in FIG. 3A includes an NTSC decoder 302, a universal format converter (UFC) 304, and a matrix 306. The NTSC decoder 302 separates the composite video signal into its luminance and chrominance components, e.g. luminance (Y), in-phase chrominance (I), and quadrature-phase chrominance (Q). A suitable NTSC decoder for use in the present invention will be readily apparent to those skilled in the art of video signal processing.

The UFC 304 enlarges the widescreen image based on the ratio signal and selects a portion of the enlarged widescreen image for display based on an offset signal. The illustrated UFC 304 receives the luminance and chrominance components representing a widescreen image from the NTSC decoder 302 at video input ports 308, an offset signal from the controller 108 (FIG. 1) at a first control port 310a, and the ratio signal from the widescreen detector 105 (FIG. 1) at a second control port 310b. The UFC 304 enlarges the widescreen image using the ratio signal at the second control port 310b and, using the offset signal at the first control port 310a, selects the portion of the enlarged widescreen image for display by the video display 102. The UFC 304 then produces the luminance and chrominance components representing the selected portion of the enlarged widescreen image at video output ports 312. A known UFC 304 that is readily modifiable by those of skill in the art for use in the present invention is described in U.S. Pat. No. 5,587,742 to Hau et al. entitled "Flexible Parallel Processing Architecture for Video Resizing," having the same assignee as the present invention.

In an exemplary embodiment, the UFC 304 enlarges the widescreen image while maintaining its aspect ratio by repeating and/or interpolating lines and pixels as needed. The UFC 304 enlarges the widescreen image based on the ratio signal from the widescreen detector 105 (FIG. 1) such that the vertical dimension of the widescreen image is approximately equal to the vertical dimension of the display device 102 and the aspect ratio of the widescreen image is maintained. In accordance with this embodiment, the horizontal dimension of the enlarged widescreen image is larger than the horizontal dimension of the video display 102.

In the exemplary embodiment, the offset signal is a horizontal offset signal. The value of the offset signal corresponds to portions of the enlarged widescreen image selected for display. When the horizontal offset signal is zero (0), the UFC 304 produces a central portion of the enlarged widescreen image for display. When the horizontal offset is positive (negative), the UFC 304 produces portion(s) of the enlarged widescreen image for display that are to the right (left) of the central portion, with larger magnitude values corresponding to portions farther from the central portion. Various other embodiments for producing different portions of the enlarged widescreen image (i.e., panning) will be readily apparent to those of skill in the art of video signal processing and are within the scope of the present invention.

The matrix 306 converts the luminance and chrominance components produced by the UFC 304 to red (R), green (G), blue (B) component signals. The video display 102 receives the RGB component signals and produces a visual image of the selected portion of the enlarged widescreen image. A suitable matrix for use with the present invention will be readily apparent to those of skill in the art of video signal processing.

Figure 3B:
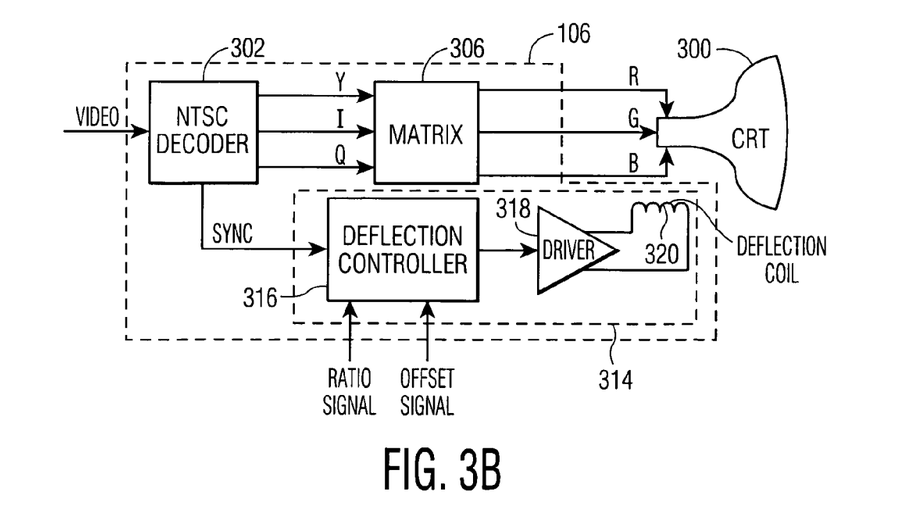
FIG. 3B is a block diagram of an alternative exemplary image processor 106 for use in the audio/video apparatus of FIG. 1.

FIG. 3B depicts an alternative exemplary embodiment of the image processor 106 for displaying a widescreen image on a video display 102 such as CRT 300. The image processor 106 illustrated in FIG. 3B includes an NTSC decoder 302, a matrix 306, and a deflection apparatus 314. The NTSC decoder 302 separates the composite video signal into its luminance and chrominance components, e.g. luminance (Y), in-phase chrominance (I), and quadrature-phase chrominance (Q). The matrix 306 converts the luminance and chrominance components produced by the NTSC decoder 302 to red (R), green (G), blue (B) component signals for display by a CRT 300.

The deflection apparatus 314 modifies the signals applied to the deflection yoke of the CRT 300 such that when the RGB component signals from the matrix 306 are displayed on the CRT 300, the CRT 300 displays a portion of an enlarged version of the widescreen image. The illustrated deflection apparatus 314 receives a synchronization signal from the NTSC decoder 302, an offset signal from the controller 108 (FIG. 1), and a ratio signal from the widescreen detector 105. The active widescreen image is enlarged based on the ratio signal from the widescreen detector 105 and the displayed portion of the enlarged widescreen image is based on the offset signal from the controller 108.

The deflection apparatus 314 receives the synchronization signal, the offset signal, and the ratio signal at a deflection controller 316. The deflection controller 316 generates a deflection signal for controlling a deflection driver 318 based on the ratio signal, the offset signal, and the synchronization signal. The deflection driver 318 energizes a deflection coil assembly 320 based on the deflection signal to modify the deflection of the CRT 300. In accordance with this embodiment, the start of the vertical sweep is delayed until the first line of the widescreen image and ends immediately after the last line of the widescreen image, effectively stretching the height of the image. In addition, the horizontal sweep time is increased in direct proportion to the vertical size increase and begins at a point in the widescreen image based on the offset signal. The results produced by this alternative embodiment are similar to those produced by the embodiment described above with reference to FIG. 3A with the deflection apparatus 314 performing the enlargement and selection functions of the UFC 304 (FIG. 3A).

Referring back to FIG. 1, the controller 108 generates the offset signal. In an exemplary embodiment, the controller 108 receives the left and right audio signals and, in certain exemplary embodiments, the video signal from the A/V separator 104. The controller 108 then analyzes the received signals and generates the offset signal based on the analyzed signals.

A first analog-to-digital (A/D) converter 110 digitizes the right audio signal and a second A/D converter 111 digitizes the left audio signal. A first voice band filter (VBF) 112, an first absolute value circuit 113, and a first peak detector 114 process the digitized right audio signal to derive a signal level that represents the voice band within the right audio signal. A second VBF 115, a second absolute value circuit 116, and a second peak detector 117 process the digitized left audio signal to derive a signal level that represents the voice band within the left audio signal.

A summation circuit 118 subtracts the left audio signal level from the right audio signal level to produce a difference signal. In an exemplary embodiment, a positive difference signal indicates that the voice band is stronger in the right audio signal than in the left audio signal, a negative difference signal indicates that the voice band is stronger in the left audio signal than in the right audio signal, and difference signal near zero indicates that the voice band in the right and left signals are substantially equal. Larger magnitude difference signals indicate greater difference in voice bands between the right and left audio signals. It is contemplated that in certain exemplary embodiments, an L-R signal obtained directly from demodulation of the multi-channel audio signal may be used to produce the difference signal. A look-up table (LUT) 120 generates the offset signal for controlling the image processor 106 based on the difference signal from the summation circuit 118.

In embodiments where the controller 108 receives the video signal, the offset signal is further based on the video signal. An A/D converter 122 digitizes the video signal. A LPF 124 filters the digital video signal to derive an average pixel level (APL) for the video signal. The look-up table (LUT) 120 then generates the offset signal for controlling the image processor 106 based on the APL in addition to the difference signal from the summation circuit 118. A change in APL indicates a scene change is detected. In certain embodiments, the portion of the widescreen image being displayed is not changed until a scene change is present or is not changed if the scene change rate exceeds a predetermined value (e.g., 5 scene changes in 10 seconds). In accordance with these embodiments, the LUT 120 maintains a constant offset value until a scene change occurs or the scene change rate falls below the predetermined value. Alternative methods for detecting scene changes such as field or frame averages will be readily apparent to those of skill in the art of video signal processing.

In certain embodiments, a timer/counter 126 is provided to prevent switching of the widescreen image portions too frequently. In the exemplary embodiment, the timer/counter 126 and LUT 120 are configured such that after the LUT 120 changes the offset signal level, the timer/counter 126 prevents the LUT 120 from changing the offset signal level for a predefined period of time.

A right audio signal delay 128, a left audio signal delay 130, and a video signal delay 132 introduce delays to the system. The right and left audio signal delays 128, 130 introduce delay to audio signals supplied to a right speaker 134 and a left speaker 136, respectively, to compensate for delay introduced to the video signal by the image processor 106. The video signal delay 132 introduces delay to the video signal to match the delay in the audio signals.

The operation of the audio/video apparatus 100 in accordance with an exemplary embodiment of the present invention is now described with reference to FIGS. 1, 4A, 4B, and 4C. The A/V separator 104 separates the audio/video signal into a composite video signal, a right audio signal, and a left audio signal. The summation circuit 118 compares the right audio signal level to the left audio signal level to generate a difference signal representing the relative strength of the right and left audio signals. The LUT 120 generates an offset signal based on the difference signal to select the proper view of an enlarged widescreen image produced by the image processor 106 for display on the video display 102.

Typically, the multi-channel audio signal that corresponds to an image such as a widescreen image provides an indication of the location of the source of a noise within the widescreen image. For example, in the voice band, when a speaker positioned in the center of a widescreen image speaks, the speaker's voice is present in the left and right audio signals of the multi-channel audio signal. Similarly, when the speaker is positioned to the left (right) of center, the speaker's voice is present to a greater extent in the left (right) audio signal and to a lesser extent, if at all, in the right (left) audio signal. Since the location of the widescreen image containing the speaker is generally the area of greatest interest to the viewer, displaying this portion of the enlarged widescreen image tends to decrease the visual impact of having non-displayed portions within the enlarged widescreen image.

Figure 4A:
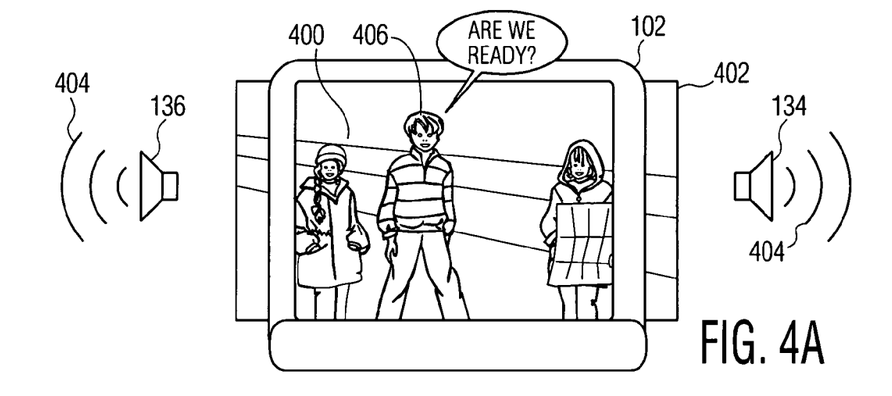
FIG. 4A is an illustration of a center portion of an enlarged widescreen image being displayed in accordance with the present invention.

FIG. 4A depicts a central portion 400 of an enlarged widescreen image 402 displayed on a video display 102. In an exemplary embodiment, the central portion is centered on the midpoint between the left side and the right side of the enlarged widescreen image 402. Soundwaves 404 emanating from both the right and left speakers 134, 136 indicate that a voice band signal is present in both the right and left audio signals at approximately equal levels, e.g., are within a threshold value of each other. Assuming the right and left voice band signal levels are approximately equal, the summation circuit 118 generates a difference signal indicating no signal level difference, e.g., a zero value. Using the difference signal, the LUT 120 generates an offset signal that instructs the image processor 106 to display the central portion 400 of the enlarged widescreen image 402 on the display device 102, thereby displaying a first speaker 406 associated with right and left voice band signals. If no audio signals are present in the voice band, the right and left voice band signal levels are approximately equal and the central portion 400 is displayed.

Figure 4B:
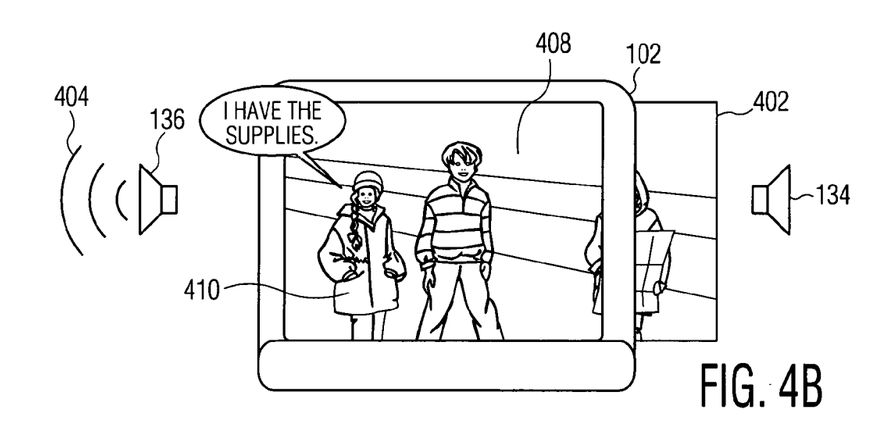
FIG. 4B is an illustration of a left portion of an enlarged widescreen image being displayed in accordance with the present invention.

FIG. 4B depicts a left portion 408 of an enlarged widescreen image 402 displayed on a video display 102. In an exemplary embodiment, the left portion 408 is centered to the left of the midpoint between the left and right sides of the enlarged widescreen image 402 and, in certain exemplary embodiments, the left side of the left portion 408 coincides with the left side of the enlarged widescreen image 402. Soundwaves 404 emanating from only the left speaker 136 indicate that a voice band signal is present in only the left audio signal. Assuming the left voice band signal level is greater than the right voice band signal level by a predefined threshold value, the difference signal generated by the summation circuit indicates a negative signal level difference. Using the difference signal, the LUT 120 generates an offset signal that instructs the image processor 106 to display the left portion 408 of the enlarged widescreen image 402 on the display device 102, thereby displaying a second speaker 410 associated with the left voice band signal.

Figure 4C:
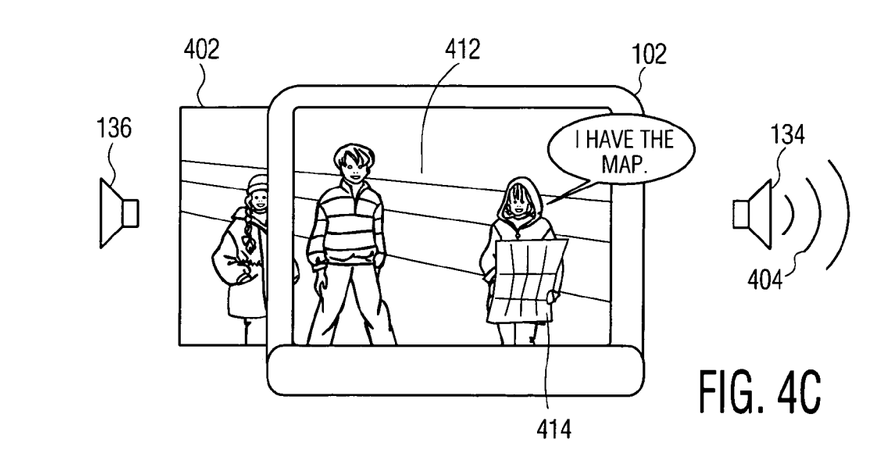
FIG. 4C is an illustration of a right portion of an enlarged widescreen image being displayed in accordance with the present invention.

FIG. 4C depicts a right portion 412 of an enlarged widescreen image 402 displayed on a video display 102. In an exemplary embodiment, the left right portion 412 is centered to the right of the midpoint between the left and right sides of the enlarged widescreen image 402 and, in certain exemplary embodiments, the right side of the right portion 412 coincides with the right side of the enlarged widescreen image 402. Soundwaves 404 emanating from only the right speaker 134 indicate that a voice band signal is present in only the right audio signal. Assuming the right voice band signal level is greater than the left voice band signal level by a predefined value, the difference signal generated by the summation circuit will indicate a positive signal level difference. Using the difference signal, the LUT 120 generates an offset signal that instructs the image processor 106 to display the right portion 412 of the enlarged widescreen image 402 on the display device 102, thereby displaying a third speaker 414 associated with the right voice band signal.

In certain exemplary embodiments, to switch to the left portion 408 (FIG. 4B), the left voice band signal level must be greater than the right voice band signal level by a first predefined value. Likewise, to switch to the right portion 412 (FIG. 4C), the right voice band signal level must be greater than the left voice band signal level by a second predefined value, which may or may not be equal to the first predefined value. Thus, different signal difference magnitudes may be used to switch to the left portion 408 than to switch to the right portion 412. In certain exemplary embodiments, to switch out of the left portion 408, the left voice band level must fall to a level such that the left voice band level does not exceed the right voice band level by more than a third predefined value. Likewise, to switch out of the right portion 412, the right voice band level must fall to a level such that the right voice band level does not exceed the left voice band level by more than a fourth predefined value. Thus, different signal difference magnitudes may be used to switch into the left portion 408 (right portion 412) than out of the left portion 408 (right portion 412)

In certain exemplary embodiments, switching between views, such as between the left portion 408 (FIG. 4B) and the right portion 412 (FIG. 4C), is enhanced by waiting for a scene change to occur, waiting for the scene change rate to drop below a predetermined value, or requiring a specified period of time to pass after each portion is selected before selecting another portion for display to prevent switching between portions too frequently.

In certain exemplary embodiments, a plurality of portions are available for display between the left portion 408 (FIG. 4B) and the right portion 412 (FIG. 4C). In accordance with this embodiment, when the offset signal indicates that the left audio signal level is greater than the right audio signal level by a first predefined threshold value, the portions between the currently displayed portion and the left portion are displayed sequentially, essentially panning toward the left side of the sized image. Further, when the offset signal indicates that the left and right audio signal levels are within a threshold value of each other, the portions between the currently displayed portion and the center portion are displayed sequentially, essentially panning toward the center of the sized image.

In an exemplary embodiment, the delays 128, 130, and 132, introduce delay to the audio signals and the video signal to allow the portion of the widescreen image selected for display to change prior to the presentation of the audio and video information used to determine the portion to display at the video display 102 and the right and left speakers 134, 136. Thus, the portion of the widescreen image selected for display changes prior to the presentation of the video signal and the corresponding audio signal on which the selection of the portion is based. This allows the display of a portion of the widescreen image containing an audio source, such as a human, prior to the audio source producing an audible noise, rather than abruptly transitioning to the selected portion when the audio source emits an audible noise. In certain exemplary embodiments, longer delays enable further refinement of selected portion transitions. For example, the selected portion may smoothly pan from the current selected portion to the portion containing the audio source during a period of several seconds before the audio source emits an audible noise. In certain exemplary embodiments, the portion is switched when an audible noise is detected. In accordance with this embodiment, minimal or no delay is needed.

While a particular embodiment of the present invention has been shown and described in detail, adaptations and modifications will be apparent to one skilled in the art. For example, although the present invention has been described in terms of sizing a widescreen image for display on a standard video display, the present invention may be used to size a widescreen image for display on a widescreen video display having a smaller aspect ratio. Such adaptations and modifications of the invention may be made without departing from the scope thereof, as set forth in the following claims.

We claim:

1. A method for displaying an active video image from an image signal on a video display, each of the active video image and the video display having an aspect ratio, the image signal having a corresponding multi-channel audio signal that may be processed to produce at least a left audio channel and a right audio channel, the aspect ratio of the active video image being wider than the aspect ratio of the display, the method comprising the steps of:
    sizing the active video image such that the vertical dimension of the sized image is substantially equal to the vertical dimension of the video display, the sizing resulting in the horizontal dimension of the sized image being larger than the horizontal dimension of the video display; and
    displaying a portion of the sized image responsive to an audio track, the displayed portion having a horizontal dimension substantially equal to the horizontal dimension of the video display.

2. The method of claim 1, wherein the displaying step comprises at least the step of:
    analyzing the audio track to develop an offset signal, the offset signal representing a signal level difference between a left audio signal level of the left audio channel and a right audio signal level of the right audio channel.

3. The method of claim 2, wherein the displaying step further comprises at least the step of:
    analyzing an active portion of the image signal to identify a scene change;
    wherein the offset signal is further responsive to the identified scene change.

4. The method of claim 2, wherein the displaying step further comprises at least the step of:
    tracking a time period since the offset signal was last changed;
    wherein the offset signal is further responsive to the tracked time period.

5. The method of claim 2, further comprising:
    delaying the video signal and the multi-channel audio signal prior to presenting the portion of the sized image such that the generated offset signal results in the display of the portion of the sized image corresponding to a portion of the multi-channel audio signal that has not yet been presented.

6. The method of claim 1, wherein the sized image has a left side and a right side and wherein the displaying step comprises at least the steps of:
    panning the portion of the sized image toward the left side of the sized image if a left audio signal level of the left audio channel is greater than a right audio signal level of the right audio channel by a first threshold value;
    panning the portion of the sized image toward the right side of the sized image if the right audio signal level is greater than the left audio signal level by a second threshold value; and
    panning the portion of the sized image toward a midpoint between the left and right sides of the sized image if the left audio signal level is not greater than the right audio signal level by a third threshold value and the right audio signal level is not greater than the left audio signal level by a fourth threshold value.

7. The method of claim 1, wherein the sized image has a left side and a right side, wherein the sized image has a left display area corresponding to the left side of the sized image, a right display area corresponding to the right side of the sized image, and a center display area corresponding to a midpoint between the left display area and the right display area, and wherein the displaying step comprises at least the steps of:

displaying the left display area if a left audio signal level of the left audio channel is greater than a right audio signal level of the right audio channel by a first threshold value;

displaying the right display area if the right audio signal is greater than the left audio signal by a second threshold value; and displaying the center display area if the left audio signal level is not greater than the right audio signal level by the first threshold value and the right audio signal level is not greater than the left audio signal level by the second threshold value.

8. A method for displaying an active widescreen video image from an image signal on a standard video display, each of the active widescreen video image and the standard video display having an aspect ratio, the image signal having a corresponding multi-channel audio signal that may be processed to produce at least a left audio channel and a right audio channel, the aspect ratio of the active widescreen video image being wider than the aspect ratio of the standard video display, the method comprising the steps of:

enlarging the active widescreen video image such that the vertical dimension of the enlarged image is substantially equal to the vertical dimension of the standard video display, the enlarging resulting in the horizontal dimension of the enlarged image being larger than the horizontal dimension of the standard video display;

generating an offset signal responsive to an audio track, the offset signal representing a signal level difference between a left audio signal level of the left audio channel and a right audio signal level of the right audio channel; and displaying a portion of the enlarged image corresponding to the generated offset signal, the displayed portion having a horizontal dimension substantially equal to the horizontal dimension of the standard video display and a vertical dimension substantially equal to the vertical dimension of the standard video display.

9. The method of claim 8, wherein the generating step further comprises at least the step of:

analyzing the image signal to identify a scene change;

wherein the offset signal is further responsive to the identified scene change.

10. The method of claim 8, wherein the generating step further comprises at least the step of:

tracking a time period since the offset signal was last changed;

wherein the offset signal is further responsive to the tracked time period.

11. An apparatus for displaying an active video image from an image signal on a video display, each of the active video image and the video display having an aspect ratio, the image signal having a corresponding multi-channel audio signal that may be processed to produce at least a left audio channel and a right audio channel, the aspect ratio of the active video image being wider than the aspect ratio of the display, the apparatus comprising:

a controller that produces an offset signal responsive to the multi-channel audio signal; and an image processor that sizes the image and displays a portion of the sized image corresponding to the offset signal.

12. The apparatus of claim 11, wherein said controller comprises:

a difference circuit for generating a difference signal based on the difference between a left audio signal level of the left channel and a right audio signal level of the right channel; and a look-up table for generating the offset signal based on the generated difference signal.

13. The apparatus of claim 12, further comprising:

a timer coupled to the look-up table, the timer detecting changes in the generated offset signal and preventing the look-up table from updating the offset signal for a predefined period of time after each detected change in the generated offset signal.

14. The apparatus of claim 12, further comprising:

a filter coupled to the look-up table that processes each field of the video signal to determine an average pixel level for the field, wherein the look-up table updates the generated offset signal responsive to the average pixel level from field to field.

15. The apparatus of claim 11, wherein the image processor comprises:

a universal format converter that processes a video signal produced by a decoder and the offset signal produced by the controller to size the image and select the portion of the sized image corresponding to the offset signal for display by the display device.

16. The apparatus of claim 11, wherein the video signal includes a synchronization signal and wherein the image processor comprises:

a deflection controller that generates a deflection signal based on the offset signal generated by the controller and the synchronization signal;

a deflection coil assembly which is configured to modify the deflection of the video display; and a deflection driver that energizes the deflection coil assembly responsive to the deflection signal such that the video display displays the portion of the sized image corresponding to the offset signal.

17. A system for displaying an active video image from an image signal on a video display, each of the active video image and the video display having an aspect ratio, the image signal having a corresponding multi-channel audio signal that may be processed to produce at least a left audio channel and a right audio channel, the aspect ratio of the active video image being wider than the aspect ratio of the display, the system comprising:

means for sizing the active video image such that the vertical dimension of the sized image is substantially equal to the vertical dimension of the video display, the sizing resulting in the horizontal dimension of the sized image being larger than the horizontal dimension of the video display; and means for displaying a portion of the sized image responsive to an audio track, the displayed portion having a horizontal dimension substantially equal to the horizontal dimension of the video display.

18. The system of claim 17, wherein the displaying means comprises:

means for analyzing the audio track to develop an offset signal, the offset signal representing a signal level difference between a left audio signal level of the left audio channel and a right audio signal level of the right audio channel.

19. The system of claim 17, wherein the sized image has a left side and a right side and wherein the displaying means comprises at least:

means for panning the portion of the sized image toward the left side of the sized image if a left audio signal level of the left audio channel is greater than a right audio signal level of the right audio channel by a first threshold value;

means for panning the portion of the sized image toward the right side of the sized image if the right audio signal level is greater than the left audio signal level by a second threshold value; and     means for panning the portion of the sized image toward a midpoint between the left and right sides of the sized image if the left audio signal level is not greater than the right audio signal level by the first threshold value and the right audio signal level is not greater than the left audio signal level by the second threshold value.

20. The system of claim 17, wherein the sized image has a left side and a right side, wherein the sized image has a left display area corresponding to the left side of the sized image, a right display area corresponding to the right side of the sized image, and a center display area corresponding to a midpoint between the left display area and the right display area, and wherein the displaying means comprises at least:

means for displaying the left display area if a left audio signal level of the left audio channel is greater than a right audio signal level of the right audio channel by a first threshold value;

means for displaying the right display area if the right audio signal is greater than the left audio signal by a second threshold value; and     means for displaying the center display area if the left audio signal level is not greater than the right audio signal level by the first threshold value and the right audio signal level is not greater than the left audio signal level by the second threshold value.

\* \* \* \* \*